US012772175B2

(12) United States Patent
Deghel et al.

(10) Patent No.: US 12,772,175 B2
(45) Date of Patent: Oct. 20, 2026

(54) DETERMINATION OF REFERENCE SIGNAL RESOURCES IN MULTI-TRANSMISSION RECEPTION POINT UPLINK SCHEMES

(71) Applicant: Nokia Technologies Oy, Espoo (FI)

(72) Inventors: Matha Deghel, Massy (FR); Keeth Saliya Jayasinghe Laddu, Espoo (FI); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 533 days.

(21) Appl. No.: 18/254,528

(22) PCT Filed: Dec. 17, 2021

(86) PCT No.: PCT/EP2021/086487
§ 371 (c)(1),
(2) Date: May 25, 2023

(87) PCT Pub. No.: WO2022/148638
PCT Pub. Date: Jul. 14, 2022

(65) Prior Publication Data

US 2024/0023026 A1 Jan. 18, 2024

Related U.S. Application Data

(60) Provisional application No. 63/135,943, filed on Jan. 11, 2021.

(51) Int. Cl.
*H04W 52/14* (2009.01)
*H04W 52/24* (2009.01)
*H04W 72/1273* (2023.01)

(52) U.S. Cl.
CPC ....... *H04W 52/146* (2013.01); *H04W 52/242* (2013.01); *H04W 72/1273* (2013.01)

(58) Field of Classification Search
CPC ... H04W 76/27; H04W 76/15; H04W 52/242; H04W 52/146
See application file for complete search history.

(56) References Cited

U.S. PATENT DOCUMENTS

2020/0015229 A1* 1/2020 Yang ..................... H04L 5/0055
2020/0107272 A1 4/2020 He et al.
(Continued)

FOREIGN PATENT DOCUMENTS

CN 112088550 A 12/2020
WO 2020056180 A1 3/2020
WO 2022/011159 A1 1/2022

OTHER PUBLICATIONS

Office Action received for corresponding European Patent Application No. 21840865.6, dated Dec. 12, 2024, 6 pages.
(Continued)

*Primary Examiner* — Tu X Nguyen
(74) *Attorney, Agent, or Firm* — Carter, DeLuca & Farrell LLP

(57) ABSTRACT

Systems, methods, apparatuses, and computer program products for determining reference signal (RS) resources for pathloss calculations for multi-transmission reception point (TRP) uplink (UL) schemes are provided. A method may include detecting by a user equipment that a pathloss reference reference-signal is not provided for multi-transmission reception point uplink repetition or transmission scheme. The method may also include determining a first reference signal resource and a second reference signal resource as a result of the detecting. The method may further include calculating two pathloss values using the first reference signal resource and the second reference signal resource. Further, the method may include performing separate uplink power control for repetitions or transmissions toward dif-
(Continued)

ferent transmission reception points according to the two pathloss values.

7 Claims, 7 Drawing Sheets

(56) References Cited

U.S. PATENT DOCUMENTS

2020/0351794 A1 11/2020 Xu et al.
2022/0030620 A1* 1/2022 Cirik .................... H04W 16/28

OTHER PUBLICATIONS

Office Action received for corresponding Japanese Patent Application No. 2023-541785, dated Aug. 6, 2024, 3 pages of office action and 4 pages of summary available.
"New WID: Further enhancements on MIMO for NR", 3GPP TSG RAN Meeting #86, RP-193133, Agenda: 9.1.1, Samsung, Dec. 9-12, 2019, 5 pages.
"3rd Generation Partnership Project; Technical Specification Group Radio Access Network; NR; Physical layer procedures for data (Release 16)", 3GPP TS 38.214, V16.3.0, Sep. 2020, pp. 1-166.
"3rd Generation Partnership Project; Technical Specification Group Radio Access Network; NR; Physical layer measurements (Release 16)", 3GPP TS 38.215, V16.4.0, Dec. 2020, pp. 1-25.
"3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.
International Search Report and Written Opinion received for corresponding Patent Cooperation Treaty Application No. PCT/EP2021/086487, dated Apr. 4, 2022, 15 pages.
"On beam management enhancements for multi-TRP", 3GPP TSG RAN WG1 Meeting #102-e, R1-2005784, Agenda: 8.1.2.3, Fraunhofer IIS, Aug. 17-28, 2020, 3 pages.
"Remaining Issues on Multi-beam operation", 3GPP TSG-RAN WG1 Meeting #103-e, R1-2008437, Agenda: 7.2.6, Apple Inc, Oct. 26-Nov. 13, 2020, 8 pages.
"Enhancements on Multi-beam Operation", 3GPP TSG-RAN WG1 Meeting #103-e, R1-2008910, Agenda: 8.1.1, Lenovo, Oct. 26-Nov. 13, 2020, 10 pages.
"Enhancements on Multi-TRP for PDCCH, PUCCH and PUSCH", 3GPP TSG RAN WG1 #103-e, R1-2008574, Agenda: 8.1.2.1. LG Electronics, Oct. 26-Nov. 13, 2020, 7 pages.
"3rd Generation Partnership Project; Technical Specification Group Radio Access Network; NR; Physical layer procedures for control (Release 16)", 3GPP TS 38.213, V16.4.0, Dec. 2020, pp. 1-181.
"Summary #1 of Multi-TRP PUCCH and PUSCH Enhancements", 3GPP TSG RAN WG1 #107-e, R1-2112583, Agenda: 8.1.2.1, Nokia, Nov. 11-19, 2021, 43 pages.
"Enhancements for Multi-TRP URLLC Schemes", 3GPP TSG RAN WG1 #107-e Meeting, R1-2112177, Agenda: 8.1.2.1, Nokia, Nov. 11-19, 2021, 11 pages.
"Enhancements for Multi-TRP URLLC Schemes", 3GPP TSG RAN WG1 #104-e Meeting, R1-2101006, Agenda: 8.1.2.1, Nokia, Jan. 25-Feb. 5, 2021, 22 pages.
"Enhancements for Multi-TRP URLLC Schemes", 3GPP TSG RAN WG1 #104-bis-e Meeting, R1-2103366, Agenda: 8.1.2.1, Nokia, Apr. 12-20, 2021, 32 pages.
"Enhancements for Multi-TRP URLLC Schemes", 3GPP TSG RAN WG1 #106-e Meeting, R1-2108053, Agenda: 8.1.2.1, Nokia, Aug. 16-27, 2021, 21 pages.
"Enhancements for Multi-TRP URLLC Schemes", 3GPP TSG RAN WG1 #106-bis-e Meeting, R1-2109871, Agenda: 8.1.2.1, Nokia, Oct. 11-19, 2021, 12 pages.
Office action received for corresponding Chinese Patent Application No. 202180089939.8, dated Aug. 14, 2025, 7 pages of office action and no page of translation available.
"Remaining Issues on Multi-Beam Operation", 3GPP TSG RAN WG1 #101, R1-2004230, Agenda: 7.2.6.3, Apple Inc., May 25-Jun. 5, 2020, 12 pages.
"Enhancements on Multi-TRP Inter-Cell Operation", 3GPP TSG-RAN WG1 Meeting #103-e, R1-2009252, Agenda: 8.1.2.2, Qualcomm Incorporated, Oct. 26-Nov. 13, 2020, pp. 1-5.
Office action received for corresponding European Patent Application No. 21840865.6, dated Nov. 27, 2025, 6 pages.
Office action received for corresponding Chinese Patent Application No. 202180089939.8, dated Apr. 1, 2026, 4 pages of office action and no page of translation available.

* cited by examiner

DETERMINATION OF REFERENCE SIGNAL RESOURCES IN MULTI-TRANSMISSION RECEPTION POINT UPLINK SCHEMES

RELATED APPLICATION

This application was originally filed as PCT Application No. PCT/EP2021/086487, filed on Dec. 17, 2021, which claims priority from U.S. Application No. 63/135,943, filed on Jan. 11, 2021, each of which is incorporated herein by reference in its entirety.

CROSS-REFERENCE TO RELATED APPLICATION

The present application is related to and claims the benefit and priority of U.S. Provisional Patent Application No. 63/135,943, filed Jan. 11, 2021, the entirety of which is hereby incorporated herein by reference.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for determining reference signal resources in multi-transmission reception point uplink schemes.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include detecting by a user equipment that a pathloss reference reference-signal is not provided for multi-transmission reception point uplink repetition or transmission scheme. The method may also include determining a first reference signal resource and a second reference signal resource as a result of the detecting. The method may further include calculating two pathloss values using the first reference signal resource and the second reference signal resource. In addition, the method may include performing separate uplink power control for repetitions or transmissions towards different transmission reception points according to the two pathloss values.

Other example embodiments are directed to an apparatus that may include at least one processor and at least one memory including computer program code. The at least one memory and the computer program code are configured, with the at least one processor to cause the apparatus at least to detect that a pathloss reference reference-signal is not provided for multi-transmission reception point uplink repetition or transmission scheme. The apparatus may also be caused to determine a first reference signal resource and a second reference signal resource as a result of the detecting. The apparatus may further be caused to calculate two pathloss values using the first reference signal resource and the second reference signal resource. In addition, the apparatus may be caused to perform separate uplink power control for repetitions or transmissions toward different transmission reception points according to the two pathloss values.

Other example embodiments are directed to an apparatus. The apparatus may include means for detecting by a user equipment that a pathloss reference reference-signal is not provided for multi-transmission reception point uplink repetition or transmission scheme. The apparatus may also include means for determining a first reference signal resource and a second reference signal resource as a result of the detecting. The apparatus may further include means for calculating two pathloss values using the first reference signal resource and the second reference signal resource. In addition, the apparatus may include means for performing separate uplink power control for repetitions or transmissions towards different transmission reception points according to the two pathloss values.

In accordance with other example embodiments, a non-transitory computer readable medium may be encoded with instructions that may, when executed in hardware, perform a method. The method may include detecting by a user equipment that a pathloss reference reference-signal is not provided for multi-transmission reception point uplink repetition or transmission scheme. The method may also include determining a first reference signal resource and a second reference signal resource as a result of the detecting. The method may further include calculating two pathloss values using the first reference signal resource and the second reference signal resource. In addition, the method may include performing separate uplink power control for repetitions or transmissions towards different transmission reception points according to the two pathloss values.

Other example embodiments may be directed to a computer program product that performs a method. The method may include detecting by a user equipment that a pathloss reference reference-signal is not provided for multi-transmission reception point uplink repetition or transmission scheme. The method may also include determining a first reference signal resource and a second reference signal resource as a result of the detecting. The method may further include calculating two pathloss values using the first reference signal resource and the second reference signal resource. In addition, the method may include performing separate uplink power control for repetitions or transmissions towards different transmission reception points according to the two pathloss values.

Other example embodiments may be directed to an apparatus that may include circuitry configured to detect that a pathloss reference reference-signal is not provided for multi-transmission reception point uplink repetition or transmission scheme. The apparatus may also include circuitry configured to determine a first reference signal resource and a second reference signal resource as a result of the detecting. The apparatus may further include circuitry configured to calculate two pathloss values using the first reference signal resource and the second reference signal resource. In addition, the apparatus may include circuitry configured to perform separate uplink power control for repetitions or transmissions toward different transmission reception points according to the two pathloss values.

BRIEF DESCRIPTION OF THE DRAWINGS

For proper understanding of example embodiments, reference should be made to the accompanying drawings, wherein:

FIG. 7(*b*) illustrates another apparatus, according to certain example embodiments.

DETAILED DESCRIPTION

Figure 1:
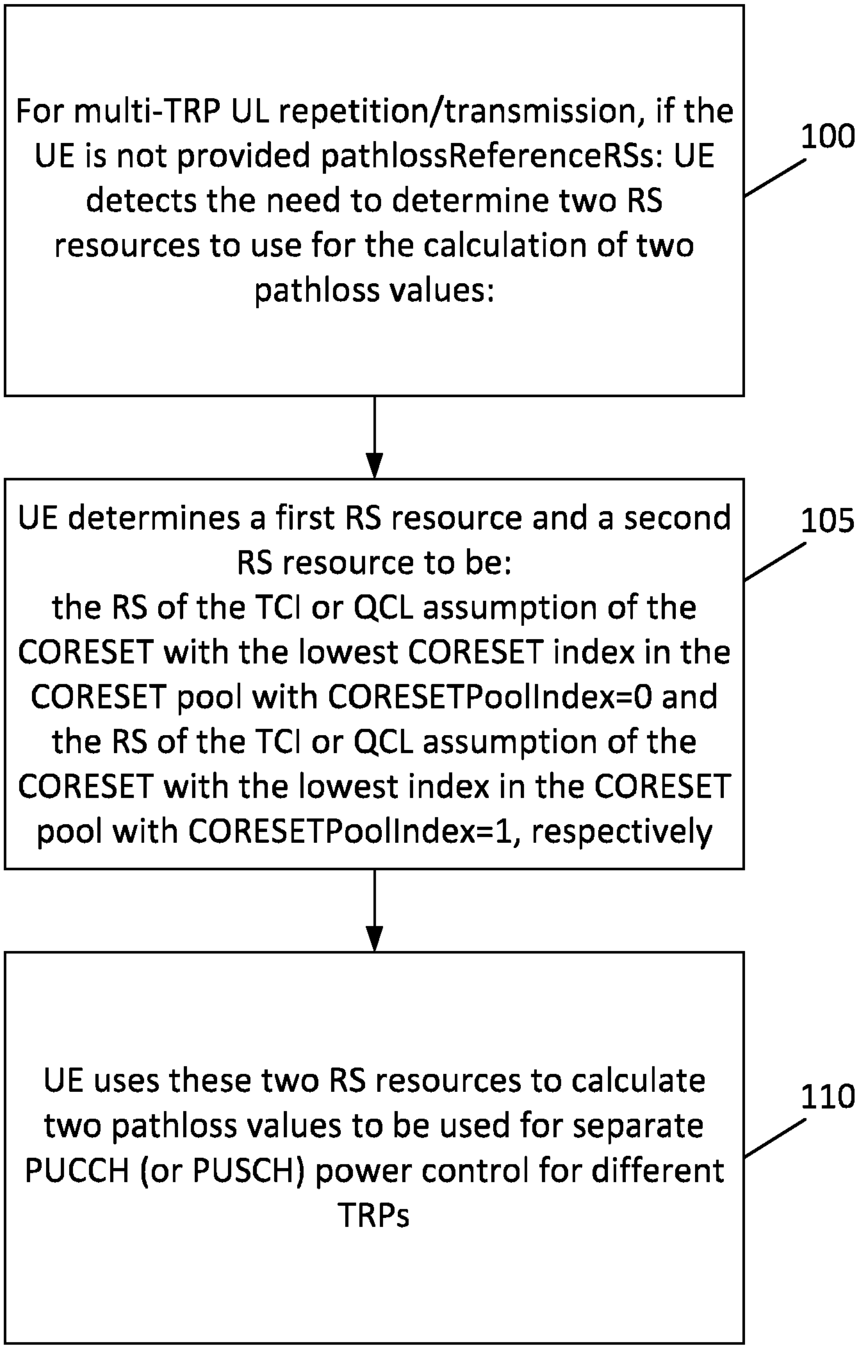
FIG. 1 illustrates a flow diagram of a method for determining two reference signal (RS) resources for the calculation of two pathloss values in the case of a multi-downlink control information (multi-DCI) multi-transmission reception point (multi-TRP) scheme, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for determining reference signal (RS) resources for pathloss calculations for multi-transmission reception point (TRP) uplink (UL) schemes.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

NR describes Quasi co-location (QCL), transmission configuration indicator (TCI) states, and beam indication for physical downlink control channel (PDCCH) and physical downlink shared channel (PDSCH). For example, NR defines a set of QCL rules that may be signaled to a user equipment (UE). These QCL rules define what properties are the same between two reference signals (RSs), and individual channel properties may be grouped in four groups including, for example, QCL types A, B, C, and D.

In certain cases, RSs (except for synchronization signal (SS)/physical broadcast channel (PBCH) block and periodic channel state information-RS (CSI-RS)) may need a valid TCI state to be provided. In cases where QCL Type D is not applicable (i.e., in frequency range 1 (FR1)), a TCI state may include a single RS, and that RS may provide the large-scale channel properties corresponding to QCL Type A, Type B, or Type C. However, for cases when QCL Type D is applicable (i.e., in frequency range 2 (FR2)), the TCI state may include two RSs, where one of the RSs provides the large-scale channel properties corresponding to QCL Type A, Type B, or Type C, and the second RS provides the large-scale channel properties corresponding to QCL Type D.

A TCI state that can be configured and indicated may include parameters for configuring a QCL relationship between one or two downlink (DL) RSs and the demodulation reference signal (DMRS) ports of the PDSCH, the DMRS port of PDCCH, or the CSI-RS port(s) of a CSI-RS resource. In addition, a QCL relationship may be provided within the TCI state configuration (or assumed based on a default relationship) where QCL-Type 1 is for the first DL RS, and QCL-Type 2 is for the second DL RS (if configured) . For cases where direct TCI state is not available for the UE, the UE may use default QCL assumptions.

For example, for PDCCH, the UE may be configured with one or multiple control resource sets (CORESETs). In this case, the PDCCH may be monitored, for example, from multiple TRPs (multi-beam PDCCH). Further, each CORESET may be configured with K>1 TCI states from which medium access control element (MAC-CE) signaling indicates which TCI state is used for QCL indication (and beam indication: Type D). In other cases, the UE may assume that the DMRS antenna port associated with PDCCH receptions in the CORESET configured by PDCCH-configSIB1 in master information block (MIB), the DMRS antenna port associated with corresponding PDSCH receptions, and the corresponding SS/PBCH block are quasi co-located with respect to the average gain, QCL-Type A, and QCL-Type D properties, when applicable. This assumption may be taken if the UE is not provided by a TCI state indicating quasi co-location information of the DMRS antenna port for PDCCH reception in the CORESET.

For PDSCH, when the number of configured TCI states is above 8, MAC-CE signaling may be used to select/activate the max 8 TCI states. Otherwise, downlink control information (DCI) can point directly to the TCI index. In addition, the DCI may have a 3-bit field for selecting certain TCI states including, for example, for PDSCH beam indication. If TCI-PresentInDCI is set as “disabled” for the CORESET scheduling, the PDSCH may be scheduled by a DCI format 1_0, and the TX beam for PDSCH is the same as for the PDCCH (default mode). If the TCI-PresentinDCI is set as “enabled” and the time offset between the reception of the DL DCI and the corresponding PDSCH is equal to or greater than a threshold, Threshold-Sched-Offset, the TX beam for PDSCH may be indicated by the TCI index in DCI (dynamic mode). In addition, if the TCI-PresentinDCI is set as “enabled/disabled” and the time offset between the reception of the DL DCI and the corresponding PDSCH is less than a threshold, Threshold-Sched-Offset, the TX beam for PDSCH corresponds to the PDCCH TX beam of the lowest CORESET-ID in the latest slot in which one or more CORESETs are configured for the UE (fallback mode).

In the case of a single-DCI based multi-TRP PDSCH transmission, the maximum number of activated TCI states may be 8. In this case, the MAC-CE may be enhanced to map one or two TCI states for a TCI codepoint. In addition, if the higher layer parameter tci-PresentinDCI is enabled, a 3-bit TCI field in DCI may be provided. Each TCI codepoint in a DCI may correspond to one or two TCI states. When two TCI states are activated within a TCI code point, if indicated DMRS ports are from two CDM groups, the first and second TCI states may be applied to the first and second indicated CDM groups, respectively.

In the case of a CORESET pool index, a higher layer parameter, CORESETPoolIndex, may be used to identify a TRP. Separate CORESETs may be configured for different TRPs. For example, a maximum number of CORESETs per “PDCCH-config” may be 5, and the maximum number of CORESETs per TRP may be up to the UE capability (e.g., 3, 4, 5). In addition, each CORESET may be configured with a higher layer parameter CORESETPoolIndex which identifies a TRP. If a UE is configured by a higher layer parameter, PDCCH-Config, that contains two different values of CORESETPoolIndex in ControlResourceSet for the active bandwidth part (BWP) of a serving cell, the UE may expect to receive multiple PDCCHs scheduling fully/partially/non-overlapped PDSCHs in the time and frequency domain subject to UE capability. On the other hand, for the CORESET without CORESETPoolIndex, the UE may assume that the CORESET is assigned with CORESET-PoolIndex 0.

In the beam indication (i.e., spatial relation) for PUCCH, the gNB may configure, via radio resource control (RRC) signaling up to 8 source RSs for each PUCCH resource. A source RS may be DL SS/PBCH index, CSI-RS resource index, or a sounding reference signal (SRS) resource index. When there is more than one configured source RSs for the resource, MAC-CE signaling may be used to select one of the source RSs to be applied. In this case, the UE may determine the TX beam for PUCCH based on activated source RS, and thus dynamic beam switching may be supported for PUCCH.

In the beam indication (i.e., spatial relation) for PUSCH, the PUSCH may be scheduled by DCI format 0_0. In this case, the UE may use default spatial relation information (source RS) corresponding to the spatial relation used by the PUCCH resource with the lowest ID configured in the active BWP. Further, before RRC configuration of spatial relation information (+MAC activation) for PUCCH after the initial access, the UE may use the same TX beam for PUSCH as it used for Msg3.

In another case, PUSCH may be scheduled by DCI format 0_1, and the transmission scheme may be codebook based. Here, the UE may be configured with one or two SRS resources for codebook-based transmission where each resource may have one or multiple SRS ports. If one SRS resource is configured, the UE may transmit PUSCH using the precoder over the SRS ports of the resource as provided by transmit precoding matrix indicator (TPMI) in DCI. However, in the case of two SRS resources, the UE may transmit PUSCH using the precoder over the SRS ports of the selected resource by SRI as provided by TPMI in DCI. In addition, the SRS resource may act as a source RS for the PUSCH transmission in the spatial relation sense.

In certain cases, PUSCH scheduled by DCI format 0_1 and transmission scheme may be non-codebook based. In this case, the UE may be configured with one or multiple SRS resources where each resource may have one SRS port. Further, the UE may transmit PUSCH using the same beams as the SRS resources given by SRI in DCI (one-to-one mapping between SRS resource(s) and DMRS port(s) of PUSCH). In addition, the SRS resource may act as a source RS for the PUSCH transmission in the spatial relation sense.

3GPP TS 38.213 describes certain PUCCH/PUSCH power control and pathloss determination procedures. For example, in one case, the UE may determine the PUSCH transmission power based on the following. Specifically, if a UE transmits a PUSCH on active UL BWP b of carrier f of serving cell c using parameter set configuration with index j and PUSCH power control adjustment state with index l, the UE may determine the PUSCH transmission power $P_{PUSCH,b,f,c}(i, j, q_d, l)$ in PUSCH transmission occasion i as:

$$P_{PUSCH,b,f,c}(i, j, q_d, l) = \min\left\{\begin{matrix} P_{CMAX,f,c}(i) \\ P_{O\_PUSCH,b,f,c}(j) + 10\log_{10}\left(2^{\mu}\cdot M_{RB,b,f,c}^{PUSCH}(i)\right) + \alpha_{b,f,c}(j)\cdot PL_{b,f,c}(q_d) + \Delta_{TF,b,f,c}(i) + f_{b,f,c}(i, l) \end{matrix}\right\} [dBm] \tag{1}$$

A similar formula may be used to determine PUCCH transmission power according to:

$$P_{PUCCH,b,f,c}(i, q_u, q_d, l) = \min\left\{\begin{matrix} P_{CMAX,f,c}(i) \\ P_{O\_PUCCH,b,f,c}(q_u) + 10\log_{10}\left(2^{\mu}\cdot M_{RB,b,f,c}^{PUCCH}(i)\right) + PL_{b,f,c}(q_d) + \Delta_{F\_PUCCH}(F) + \Delta\mathrm{TF}, b, f, cf_{b,f,c}(i) + g_{b,f,c}(i, l) \end{matrix}\right\} [dBm] \tag{2}$$

The various parameters used in the formulas above are defined and explained in 3GPP TS 38.213.

However, certain example embodiments may focus on the DL pathloss, which may be denoted and defined as follows: $PL_{b,f,e}(q_d)$ is a downlink pathloss estimate in dB calculated by the UE using reference signal (RS) index $q_d$ for the active DL BWP, as described in Clause 12 of TS 38.213-g30, of carrier f of serving cell c.

In pathloss determination, the pathloss PL may be based on the difference between the higher layer indicated referenceSignalPower and the higher layer filtered reference signal received power (RSRP) computed on the indicated reference signal index ($q_d$), shown as follows: $PL_{b,f,c}(q_q)$ =referenceSignalPower−higher layer filtered RSRP, where referenceSignalPower is provided by higher layers and RSRP is defined in TS 38.215 for the reference serving cell and the higher layer filter configuration provided by QuantityConfig is defined in TS 38.331 for the reference serving cell. In some cases, the RSRP may be defined as the linear average over the power contributions of the resource elements that carry either secondary synchronization signals or CSI-RS occasions, depending on the configuration.

Based on existing procedures specified in Rel-15/Rel-16 NR, as described in TS 38.213, when the UE is not provided pathlossReferenceRSs (pathloss reference reference-signals), the UE may determine an RS source to calculate the pathloss value as follows: $PL_{b,f,c}(q_d)$ is a downlink pathloss estimate in dB calculated by the UE using RS resource index $q_d$ for the active DL BWP b of carrier f of the primary cell c. If the UE is not provided with pathlossReferenceRSs, or before the UE is provided with dedicated higher layer parameters, the UE may calculate $PL_{b,f,c}(q_d)$ using a RS resource obtained from an SS/PBCH block with the same SS/PBCH block index as the one the UE uses to obtain MIB. On the other hand, if the UE is provided with pathlossReferenceRSs and is not provided with PUCCH-SpatialRelationInfo, the UE may obtain the referenceSignal value in PUCCH-PathlossReferenceRS from the PUCCH-PathlossReferenceRS-Id with index 0 in PUCCH-PathlossReferenceRS, where the RS resource is either on the primary cell or, if provided, on a serving cell indicated by a value of pathlossReferenceLinking.

If the UE is not provided with pathlossReferenceRSs, and is not provided with PUCCH-SpatialRelationInfo, and is provided with enableDefaultBeamPL-ForPUCCH-r16, and is not provided with CORESETPoolIndex value of 1 for any CORESET, or is provided CORESETPoolIndex value of 1 for all CORESETs, in ControlResourceSet and no codepoint of a TCI field, if any, in a DCI format of any search space set maps to two TCI states, the UE may determine a RS resource index $q_d$. The RS resource index may provide a periodic RS resource with QCL-TypeD in the TCI state or the QCL assumption of a CORESET with the lowest index in the active DL BWP of the primary cell. For a PUCCH transmission over multiple slots, a same $q_d$ may apply to the PUCCH transmission in each of the multiple slots. In some cases, if the UE is not provided with pathlossReferenceRSs, the above procedure may allow the determination of a single RS source to be used for the calculation of the pathloss value. Thus, this may be applicable for the single TRP case.

In 3GPP Release-17, one of the important topics is on "Enhancements on the support for multi-TRP deployment". The list of objectives regarding the multi-TRP operation work is described in RP-193133, where one of the key objectives is described as follows: identifying and specifying features to improve reliability and robustness for channels other than PDSCH (e.g., PDCCH, PUSCH, and PUCCH) using multi-TRP and/or multi-panel. With regard to enabling multi-TRP PUCCH transmission/repetition, the following was agreed in 3GPP RAN1#102-e meeting: to enable TDMed PUCCH transmission with different beams, support configuring/activating of multiple PUCCH spatial relation information. In addition, condition may be given to a method of configuration/activation of multiple spatial relation information, use of the same PUCCH resource or different PUCCH resource for PUCCH transmission, and mapping between PUCCH repetition/symbol and spatial relation information among multiple PUCCH repetitions/multiple PUCCH symbols. Another agreement from RAN1#103-e is as follows: For multi-TRP PUCCH transmission, further investigate required power control enhancement.

As can be seen from the first agreement above, multi-TRP PUCCH repetition/transmission is agreed, under which e.g. PUCCH can be repeated in a TDM manner and where beam diversity is used for the PUCCH repetitions/transmission. In addition, as stated in the second agreement above, further investigations are required on power control enhancements when multi-TRP PUCCH repetition/transmission schemes are used. Furthermore, RAN1#103-e meeting discussed FR2 power control mechanisms where power control can now be separately supported for TRPs based on the multiple spatial relations information. For FR1 operation, in RAN1#103-e it was also agreed to support, for PUCCH multi-TRP enhancements, separate power control for different TRP.

As previously described, when the UE is not provided pathlossReferenceRSs, the existing procedures may allow the UE to determine a single RS resource to be used for the calculation of pathloss value for PUCCH power control, where this is designed for the case with a single TRP. Considering the support of multi-TRP PUCCH repetition/transmission where there can be two TRPs towards which the UE is repeating/transmitting the PUCCH, determining a single RS resource is not sufficient to support separate power control. Specifically, if the UE is not provided pathlossReferenceRSs, the UE needs to determine two RS resources used for the calculation of two pathloss values to accommodate the presence of two different TRPs/links that could have a significant difference in their respective pathloss.

In view of the above, certain example embodiments may provide power control enhancements for multi-TRP PUCCH repetition/transmission, and methods for RSs determination for pathlossReferenceRS in cases where the UE is not provided with pathlossReferenceRSs and PUCCH-SpatialrelationInfo Thus, certain example embodiments may provide ways of enabling the UE in such situations to determine two different pathloss values for multi-TRP UL schemes.

According to certain example embodiments, the UE may determine two RS resources to use for the calculation of two pathloss values for multi-TRP PUCCH/PUSCH schemes when the UE is not provided with pathlossReferenceRSs. For example, for multi-TRP UL repetition/transmission, if the UE is not provided pathlossReferenceRSs (including cases that the UE is not provided PUCCH-SpatialRelationInfo), the UE may determine two RS resources to use for the calculation of two pathloss values, respectively. The determination may depend at least partially on the TRP scheme in DL and based on the TCI state or QCL assumption of at least one CORESET(s) and/or TCI states of PDSCH. In addition, the TRP scheme in DL (for PDSCH reception) may be any of multi-DCI multi-TRP scheme, single-DCI multi-TRP scheme, or single TRP scheme. There may also be PDCCH repetition schemes with multi-TRP.

According to certain example embodiments, in case of a multi-DCI multi-TRP scheme, the UE may determine a first RS resource and a second RS resource. For example, the RS of the TCI or QCL assumption of the CORESET with the lowest CORESET index in the CORESET pool with CORESETPoolIndex=0, and the RS of the TCI or QCL assumption of the CORESET with the lowest index in the CORESET pool with CORESETPoolIndex=1, may respectively correspond to the first RS resource and the second RS resource.

In this operation, the UE may consider the latest slot in which one or more CORESETs (belonging to the corresponding CORESET pool) are configured to be monitored by the UE.

Alternatively or additionally, in other example embodiments, the UE may determine a first RS resource and a second RS resource to be the RS of the TCI state of the latest PDSCH scheduled by a PDCCH on a CORESET in the CORESET pool with CORESETPoolIndex=0, and the RS of the TCI state of the latest PDSCH scheduled by a PDCCH on a CORESET in the CORESET pool with CORESETPoolIndex=1, respectively.

Alternatively or additionally, in other example embodiments, the UE may determine a first RS resource and a second RS resource to respectively be the RS of the active TCI state with the lowest index for PDSCH scheduled by a PDCCH on a CORESET in the CORESET pool with CORESETPoolIndex=0, and the RS of the active TCI state with the lowest index for PDSCH scheduled by a PDCCH on a CORESET in the CORESET pool with CORESETPoolIndex=1.

Alternatively or additionally, in further example embodiments, the UE may determine a first RS resource and a second RS resource to respectively be the RS of the TCI state of the latest PUCCH/PUSCH scheduled (or activated) by a PDCCH on a CORESET in the CORESET pool with CORESETPoolIndex=0, and the RS of the TCI state of the latest PUCCH/PUSCH scheduled (or activated) by a PDCCH on a CORESET in the CORESET pool with CORESETPoolIndex=1.

According to certain example embodiments, in the case of a single-DCI multi-TRP scheme, the UE may determine a first RS resource and a second RS resource to respectively be the RS of the first TCI state of the lowest codepoint among the TCI codepoints containing two PDSCH's TCI states, and the RS of the second TCI state of this same TCI codepoint. Alternatively or additionally, in other example embodiments, the UE may determine a first RS resource and a second RS resource to respectively be the RS of the TCI or QCL assumption of the CORESET with the lowest index, and the RS of the TCI or QCL assumption of the CORESET with the second lowest index—e.g. in the active DL BWP of the primary cell. Alternatively or additionally, in further example embodiments, the UE may determine a first RS resource and a second RS resource to respectively be the RS of the first TCI state provided by the TCI codepoint (containing two TCI states) of the latest PDSCH scheduled with two TCI states, and the RS of the second TCI state contained in this same TCI codepoint.

In certain example embodiments, in the case of a single TRP based PDSCH reception, the UE may determine a first RS resource and a second RS resource to respectively be the RS of the TCI or QCL assumption of the CORESET with the lowest index, and the RS of the TCI or QCL assumption of the CORESET with the second lowest index—e.g. in the active DL BWP of the primary cell. Alternatively, in other example embodiments, the UE may not apply multi-TRP PUCCH/PUSCH schemes.

According to other example embodiments, in the case of PDCCH repetition schemes with multi-TRP, such as in the case of single frequency network (SFN)-like context where a CORESET could be associated with two TCI states or QCL assumptions, the UE may determine a first RS resource and a second RS resource. These two RS resources may respectively be the RS of the first TCI or QCL assumption of the CORESET with the lowest index having two TCI states or QCL assumptions, and the RS of the second TCI or QCL assumption of this same CORESET. However, in the case of non-SFN PDCCH repetition where two PDCCH search spaces (SS) sets are linked and each associated with a different CORESET, the UE may determine a first RS resource and a second RS resource to respectively be the RS of the TCI or QCL assumption of the CORESET associated with the lowest SS set index (among the linked SS sets), and the RS of the TCI or QCL assumption of the CORESET associated with the other linked SS set.

For the above cases and alternatives, since there are two TRPs/links involved in multi-TRP PUCCH/PUSCH repetition/transmission, a default order may be defined so that the UE knows which RS resource, between the two determined RS resources, to use for the calculation of which pathloss value for PUCCH/PUSCH power corresponding to a given TRP/link. According to certain example embodiments, for multi-TRP UL (i.e. PUCCH/PUSCH) repetition/transmission, if the UE is provided with a single pathlossReferenceRSs, for each of the DL schemes described above, the various alternatives described above may be at least partially used to determine a RS resource to use for the calculation of a second pathloss value.

In certain example embodiments, when common TCI is supported towards the UE, if a single common TCI state is used/indicated for UL, the UE may apply the indicated common TCI state for the first pathloss reference RS, and derive a second RS resource. In certain example embodiments, the derivation of the second RS may be based on the common UL TCI containing two QCL assumptions that provide references to determine two pathlossReferenceRSs. The derivation of the second RS resource may also be derived with a fixed relation depending on the common TCI state indicated for UL. The fixed relation may be defined or configured with respect to the common UL TCI state. In addition, the derivation of the second RS resource may be derived based on the common DL TCI state. According to certain example embodiments, for each of the two determined RS resource, the corresponding pathloss value (represented by $PL_{b,f,c}(q_d)$, where $q_d$ is the RS resource) may be calculated based on the difference between the higher layer indicated referenceSignalPower and the higher layer filtered RSRP computed on the RS resource. This pathloss value may then be used in the PUCCH/PUSCH transmission power formula described herein.

FIG. 1 illustrates a flow diagram of a method for determining two RS resources for the calculation of two pathloss values in the case of a multi-DCI multi-TRP scheme, according to certain example embodiments. At 100, for multi-TRP UL repetition/transmission, if the UE is not provided pathlossReferenceRSs, the UE may detect the need to determine two RS resources to use for the calculation of two pathloss values. At 105, the UE may determine a first RS resource and a second RS resource. The first RS resource may be the RS of the TCI or QCL assumption of the CORESET with the lowest CORESET index in the CORESET pool with CORESETPoolIndex=0, and the second RS resource may be the RS of the TCI or QCL assumption of the CORESET with the lowest index in the CORESET pool with CORESETPoolIndex=1. At 110, the UE may use these two RS resources to calculate two pathloss values to be used for separate PUCCH (or PUSCH) power control for different TRPs.

Figure 2:
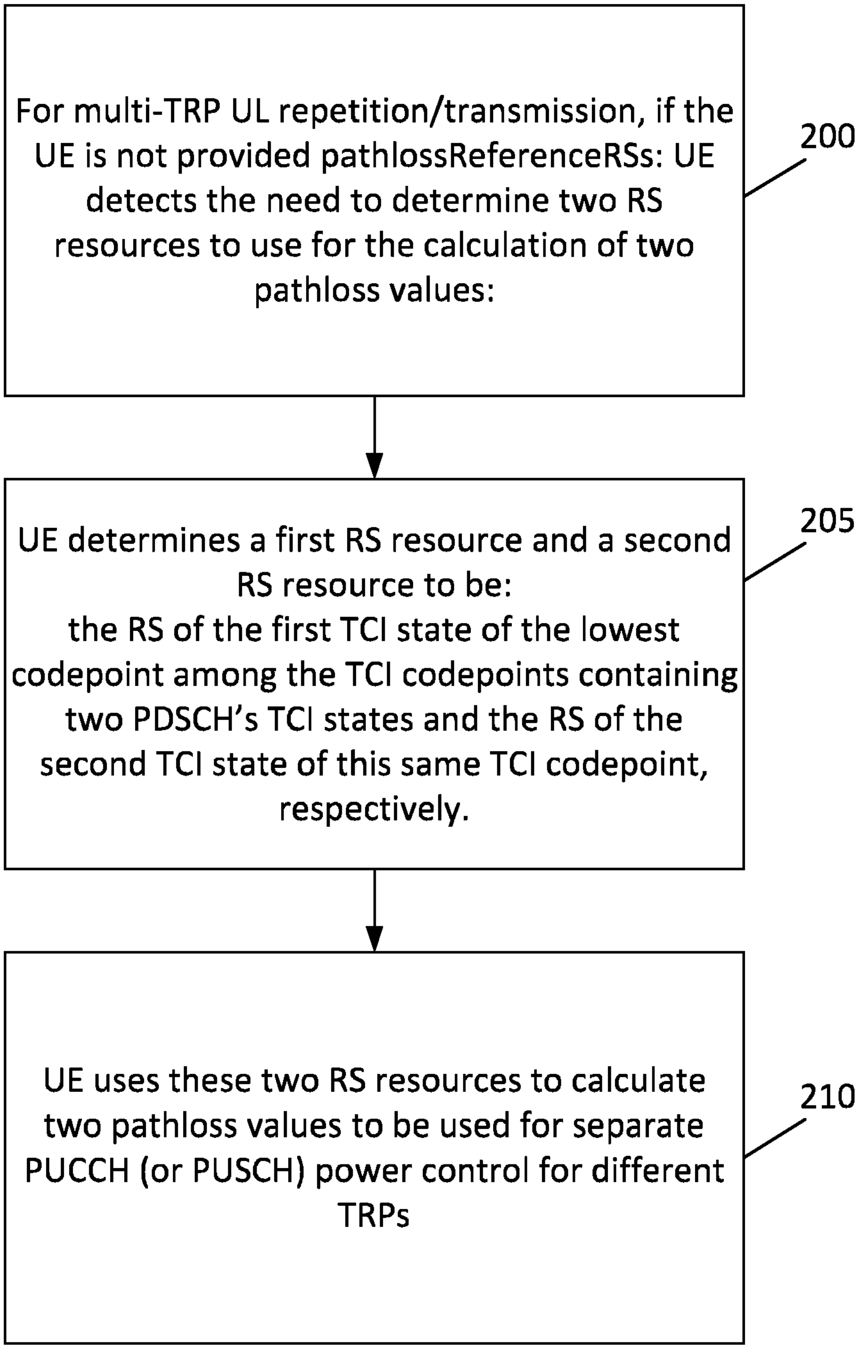
FIG. 2 illustrates a flow diagram of a method for determining two RS resources for the calculation of two pathloss values in the case of a single-DCI multi-TRP scheme, according to certain example embodiments.

FIG. 2 illustrates a flow diagram of a method for determining two RS resources for the calculation of two pathloss values in the case of a single-DCI multi-TRP scheme, according to certain example embodiments. At 200, for multi-TRP UL repetition/transmission, if the UE is not provided pathlossReferenceRSs, the UE may detect the need to determine two RS resources to use for the calculation of two pathloss values. At 205, the UE may determine a first RS resource and a second RS resource. The first RS resource may be the RS of the first TCI state of the lowest codepoint among the TCI codepoints containing two PDSCH's TCI states, and the second RS resource may be the RS of the second TCI state of this same TCI codepoint. At 210, the UE may use these two RS resources to calculate two pathloss values to be used for separate PUCCH (or PUSCH) power control for different TRPs.

Figure 3:
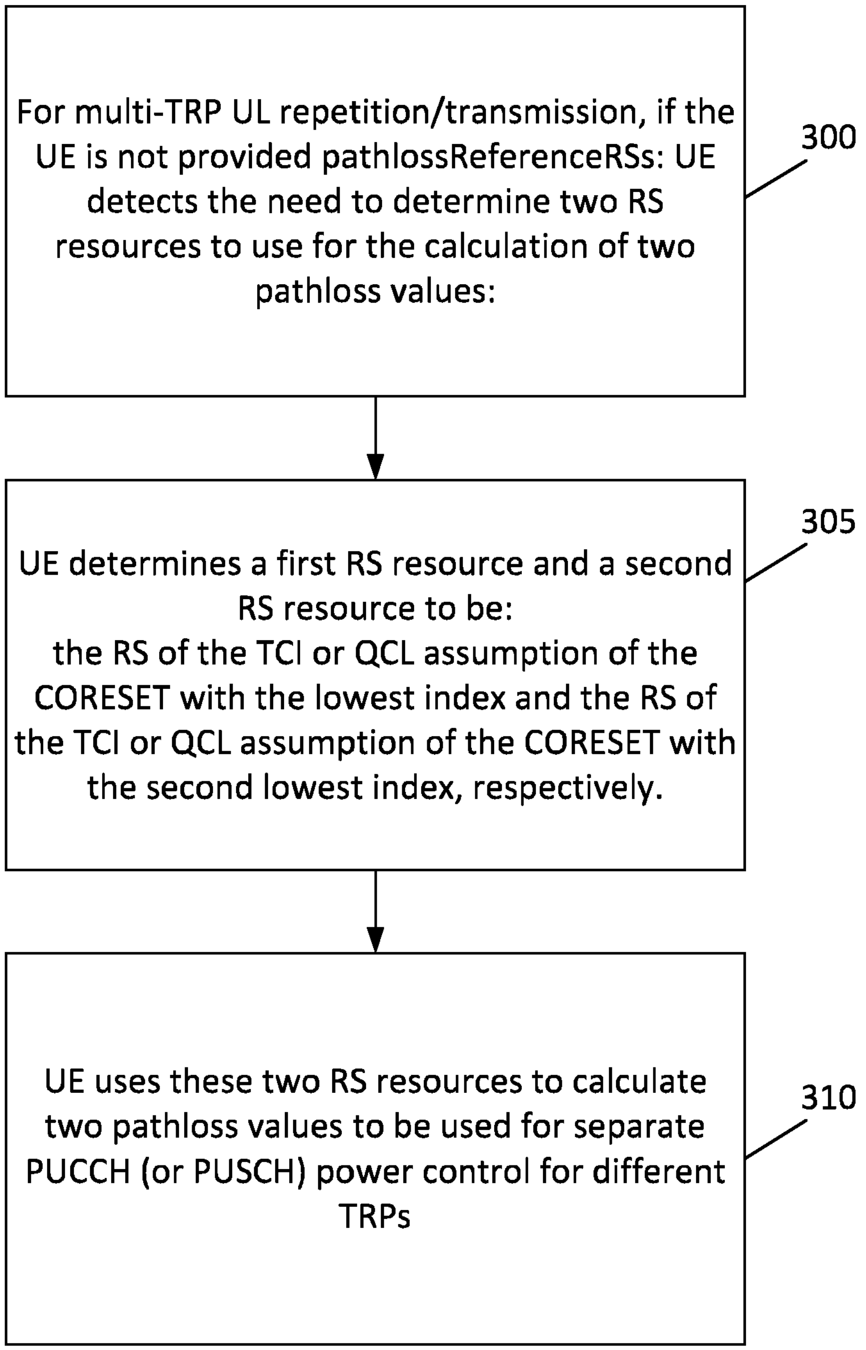
FIG. 3 illustrates a flow diagram of a method for determining two RS resources for the calculation of two pathloss values in the case of a single TRP based physical downlink shared channel (PDSCH) reception, according to certain example embodiments.

FIG. 3 illustrates a flow diagram of a method for determining two RS resources for the calculation of two pathloss values in the case of a single TRP based PDSCH reception, according to certain example embodiments. At 300, for multi-TRP UL repetition/transmission, if the UE is not provided pathlossReferenceRSs, the UE may detect the need to determine two RS resources to use for the calculation of two pathloss values. At 305, the UE may determine a first RS resource and a second RS resource. The first RS resource may be the RS of the TCI or QCL assumption of the CORESET with the lowest index, and the second RS resource may be the RS of the TCI or QCL assumption of the CORESET with the second lowest index. At 310, the UE may use these two RS resources to calculate two pathloss values to be used for separate PUCCH power control for different TRPs.

Figure 4:
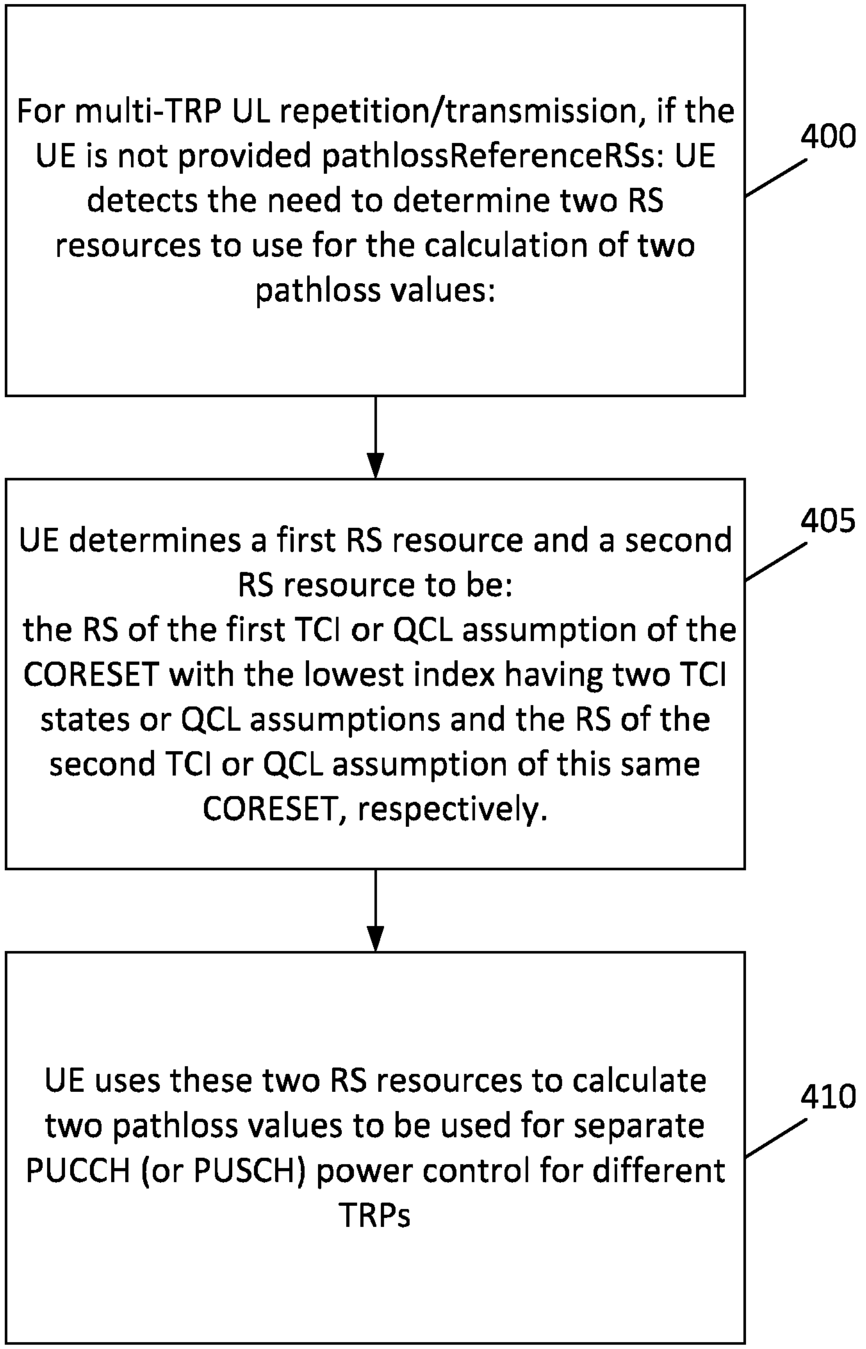
FIG. 4 illustrates a flow diagram of a method for determining two RS resources for the calculation of two pathloss values in the case of single frequency network-like (SFN-like) physical downlink control channel (PDCCH) repetition schemes with multi-TRP, according to certain example embodiments.

FIG. 4 illustrates a flow diagram of a method for determining two RS resources for the calculation of two pathloss values in the case of single frequency network-like (SFN-like) PDCCH repetition schemes with multi-TRP, according to certain example embodiments. At 400, for multi-TRP UL repetition/transmission, if the UE is not provided pathlossReferenceRSs, the UE may detect the need to determine two RS resources to use for the calculation of two pathloss values. At 405, the UE may determine a first RS resource and a second RS resource. The first RS resource may be the RS of the first TCI or QCL assumption of the CORESET with the lest index having two TCI states or QCL assumptions, and the second RS resource may be the RS of the second TCI or QCL assumption of this same CORESET. At 410, the UE may use these two RS resources to calculate two pathloss values to be used for separate PUCCH (or PUSCH) power control for different TRPs.

Figure 5:
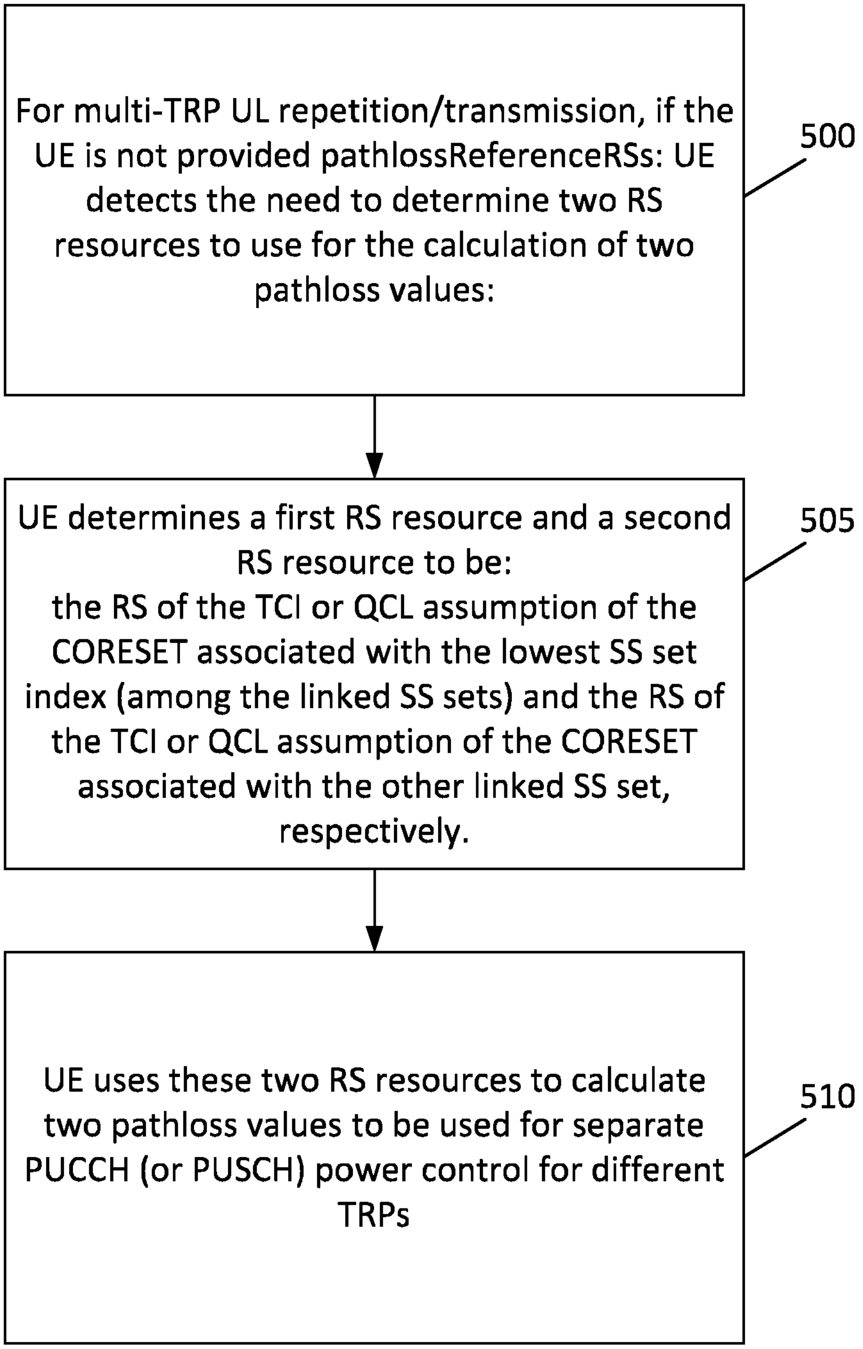
FIG. 5 illustrates a flow diagram of a method for determining two RS resources for the calculation of two pathloss values in the case of non-SFN PDCCH repetition schemes with multi-TRP, according to certain example embodiments.

FIG. 5 illustrates a flow diagram of a method for determining two RS resources for the calculation of two pathloss values in the case of non-SFN PDCCH repetition schemes with multi-TRP (where two search space sets are linked together and each associated with a different CORESET), according to certain example embodiments. At 500, for multi-TRP UL repetition/transmission, if the UE is not provided pathlossReferenceRSs, the UE may detect the need to determine two RS resources to use for the calculation of two pathloss values. At 505, the UE may determine a first RS resource and a second RS resource. The first RS resource may be the RS of the TCI or QCL assumption of the CORESET associated with the lowest SS set index (among the linked SS sets), and the second RS resource may be the RS of the TCI or QCL assumption of the CORESET associated with the other linked SS set. At 510, the UE may use these two RS resources to calculate two pathloss values to be used for separate PUCCH (or PUSCH) power control for different TRPs.

Figure 6:
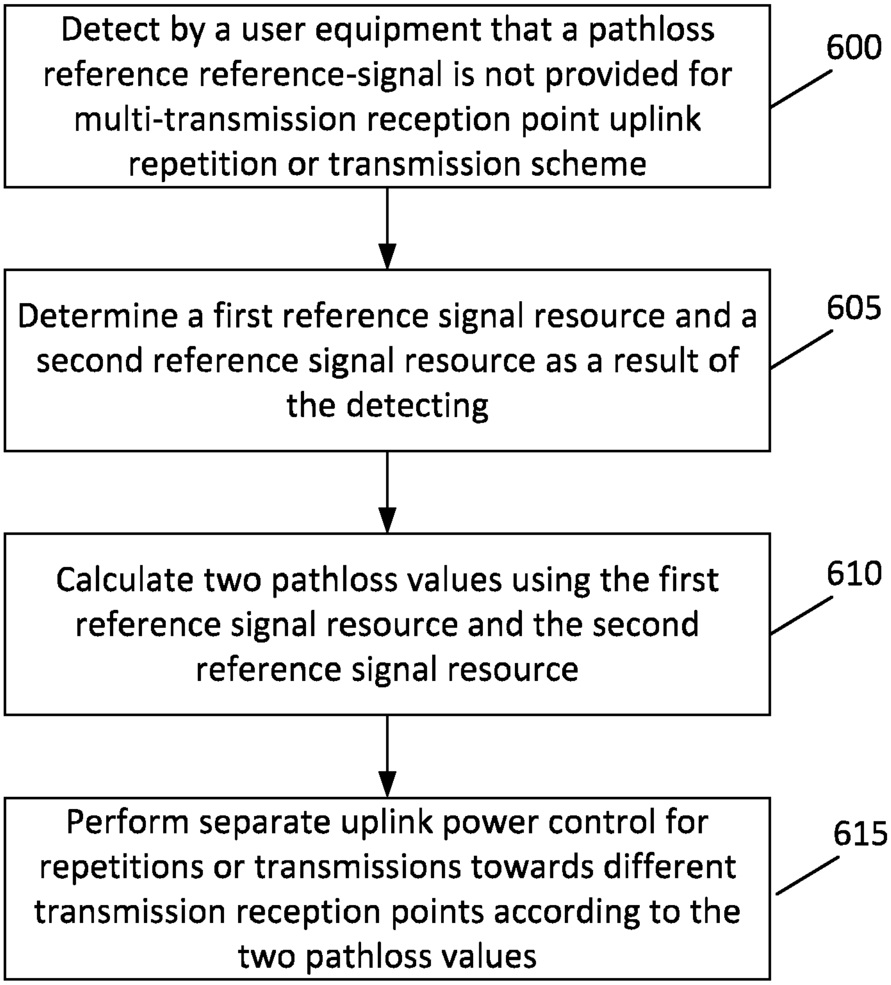
FIG. 6 illustrates a flow diagram of a method, according to certain example embodiments.

FIG. 6 illustrates a flow diagram of a method, according to certain example embodiments. In certain example embodiments, the flow diagram of FIG. 6 may be performed by a network entity or network node in a 3GPP system, such as LTE or 5G-NR. For instance, in an example embodiment, the method of FIG. 6 may be performed by a UE, for instance similar to apparatuses 10 or 20 illustrated in FIGS. 7(*a*) and 7(*b*).

According to certain example embodiments, the method of FIG. 6 may include, at 600, detecting by a user equipment that a pathloss reference reference-signal is not provided for multi-transmission reception point uplink repetition or transmission scheme. The method may also include, at 605, determining a first reference signal resource and a second reference signal resource as a result of the detecting. The method may further include, at 610, calculating two pathloss values using the first reference signal resource and the second reference signal resource. In addition, the method may include, at 615, performing separate uplink power control for repetitions or transmissions towards different transmission reception points according to the two pathloss values.

According to certain example embodiments, determining the first reference signal resource and the second reference signal resource may depend at least partially on at least one of a transmission reception point scheme in downlink, and a transmission configuration indicator state or a quasi co-location assumption of at least one control resource set or transmission configuration indicator state of a physical downlink shared channel According to other example embodiments, the transmission reception point scheme in downlink may be at least one of a multi-DCI multi-TRP scheme, a single-DCI multi-TRP scheme, a single TRP based PDSCH reception scheme, or a PDCCH repetition scheme with multi-TRP.

In certain example embodiments, in case of the multi-DCI multi-TRP scheme, the first reference signal resource may be a reference signal of a TCI or a QCL assumption of a CORESET with a lowest CORESET index in a CORESET pool with a CORESET pool index value of 0, and the second reference signal resource may be a reference signal of the TCI or the QCL assumption of the CORESET with a lowest CORESET index in the CORESET pool with a CORESET pool index value of 1.

According to certain example embodiments, the first reference signal resource and the second reference signal resource may be determined to be the reference signal of the transmission configuration indicator state of the latest physical downlink shared channel scheduled by a physical downlink control channel on a control resource set in the control resource set pool with control resource set pool index value of 0, and a reference signal of the transmission configuration indicator state of a latest physical downlink shared channel scheduled by a physical downlink control channel on a control resource set in the control resource set pool with control resource set pool index value of 1, respectively.

In certain example embodiments, the first reference signal resource and the second reference signal resource may respectively be determined to be the reference signal of an active transmission configuration indicator state with the lowest index for physical downlink shared channel scheduled by a physical downlink control channel on a control resource set in the control resource set pool with control resource set pool index value of 0, and the reference signal of the active transmission configuration indicator state with the lowest index for physical downlink shared channel scheduled by a physical downlink control channel on a control resource set in the control resource set pool with control resource set pool index value of 1.

According to some example embodiments, the first reference signal resource and the second reference signal resource may respectively be determined to be the reference signal of the transmission configuration state of the latest physical uplink control channel or physical uplink shared channel scheduled by a physical downlink control channel on a control resource set in the control resource set pool with control resource set index value of 0, and the reference signal of the transmission configuration indicator state of the latest physical uplink control channel or physical uplink shared channel scheduled by a physical downlink control channel on a control resource set in the control resource set pool with control resource set index value of 1.

In other example embodiments, in case of the single-DCI multi-TRP scheme, the first reference signal resource may be a reference signal of a first TCI state of a lowest codepoint among TCI codepoints containing two PDSCH's TCI states, and the second reference signal resource may be a reference signal of a second TCI state of the same TCI codepoint as in the first reference signal resource.

According to certain example embodiments, the first reference signal resource and the second reference signal resource may respectively be determined to be the reference signal of the transmission configuration indicator or quasi co-location assumption of the control resource set with the lowest index, and the reference signal of the transmission configuration indicator or quasi co-location assumption of the control resource set with the second lowest index.

In some example embodiments, the first reference signal resource and the second reference signal resource may respectively be determined to be the reference signal of the first transmission configuration indicator state provided by the transmission configuration indicator codepoint of the latest physical downlink shared channel scheduled with two transmission configuration indicator states, and the reference signal of the second transmission configuration indicator state contained in this same transmission configuration indicator codepoint.

In further example embodiments in case of the single TRP based PDSCH scheme, the first reference signal resource may be a reference signal of a TCI or QCL assumption of the CORESET with a lowest index, and the second reference signal resource may be a reference signal of the TCI or QCL assumption of the CORESET with the second lowest index—e.g. in the active DL BWP of the primary cell.

According to certain example embodiments, in case of the PDCCH repetition scheme with multi-TRP, and in a SFN context, the first reference signal resource may be a reference signal of a first TCI or QCL assumption of a CORESET with a lowest index having two TCI states or QCL assumptions, and the second reference signal resource may be a reference signal of a second TCI or QCI assumption of the same CORESET as with the first reference signal resource.

According to other example embodiments, in case of the PDCCH repetition scheme with multi-TRP, and in a non-SFN context where two search space sets are linked together and each associated with a different CORESET, the first reference signal resource may be a reference signal of a TCI or QCL assumption of the CORESET associated with the SS set with lowest index among linked SS sets, and the second reference signal resource may be a reference signal of the TCI or QCL assumption of the CORESET associated with the other linked SS set.

Figure 7A:
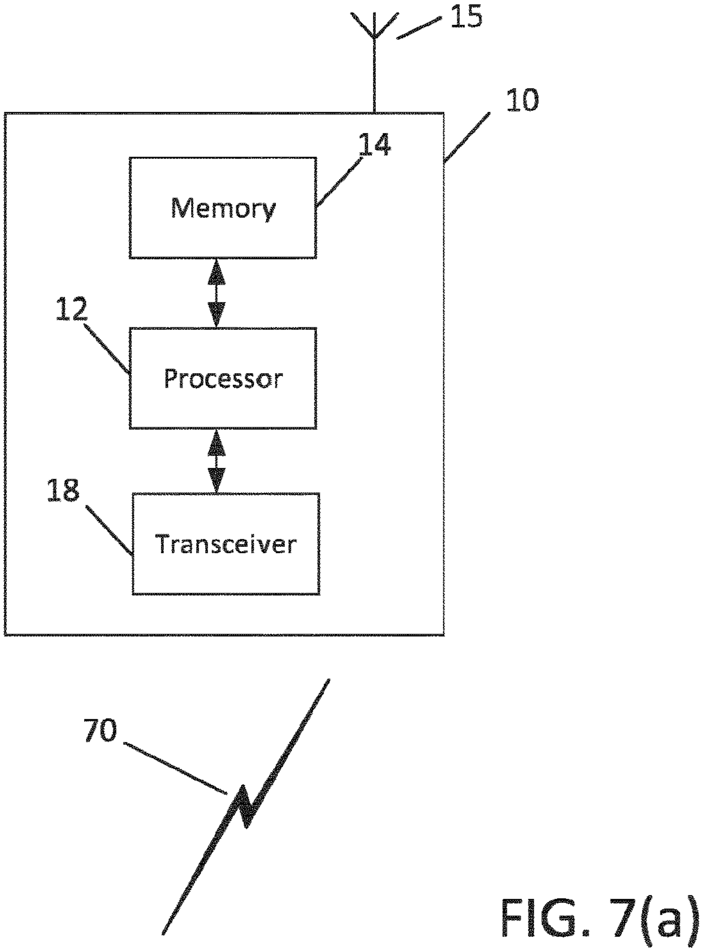
FIG. 7(*a*) illustrates an apparatus, according to certain example embodiments.
Figure 7B:
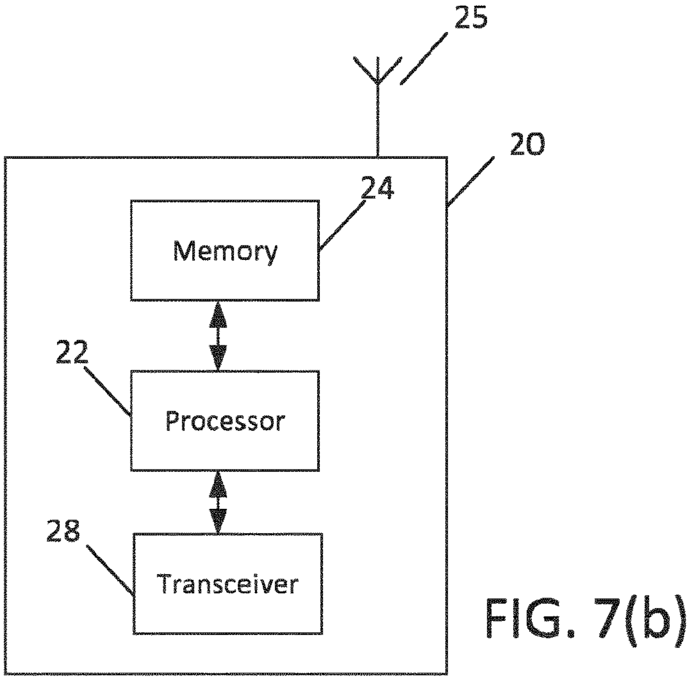

FIG. 7(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 7(*a*)

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7(*a*).

As illustrated in the example of FIG. 7(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to detect that a pathloss reference-signal is not provided for multi-transmission reception point uplink repetition or transmission scheme. Apparatus 10 may also be controlled by memory 14 and processor 12 to determine a first reference signal resource and a second reference signal resource as a result of the detecting. Apparatus 10 may further be controlled by memory 14 and processor 12 to calculate two pathloss values using the first reference signal resource and the second reference signal resource. In addition, apparatus 10 may be controlled by memory 14 and processor 12 to perform separate uplink power control for repetitions or transmissions towards different transmission reception points according to the two pathloss values.

FIG. 7(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 7(*b*)

As illustrated in the example of FIG. 7(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

Further example embodiments may provide means for performing any of the functions, steps, or procedures described herein. For example one example embodiment may be directed to an apparatus that includes means for detecting by a user equipment that a pathloss reference reference-signal is not provided for multi-transmission reception point uplink repetition or transmission scheme. The apparatus may also include means for determining a first reference signal resource and a second reference signal resource as a result of the detecting. The apparatus may further include means for calculating two pathloss values using the first reference signal resource and the second reference signal resource. In addition, the apparatus may include means for performing separate uplink power control for repetitions or transmissions toward different transmission reception points according to the two pathloss values.

Certain example embodiments described herein provide several technical improvements, enhancements, and/or advantages. In some example embodiments, it may be possible for the UE to determine two RS resources to use for calculating two pathloss values from multi-TRP PUCCH/PUSCH schemes when the UE is not provided/configured with pathlossReferenceRSs, or is only provided with a single pathlossReferenceRS. This is important in order to accommodate the presence of two different TRPs/links that could have a significant difference in their respective pathloss. According to certain example embodiments, it is also possible to determine RS resources dependent on the DL TRP scheme, where the DL TRP scheme may include, for example, a multi-DCI multi-TRP scheme, a single-DCI multi-TRP scheme, or a PDCCH repetition with multi-TRP scheme.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5GC 5G Core
CORESET Control Resource Set
DCI Downlink Control Information
DL Downlink
eNB Enhanced Node B
gNB 5G or Next Generation NodeB
MAC CE Medium Access Control Element
NR New Radio
PDCCH Physical Downlink Control Channel'
PDSCH Physical Downlink Shared Channel
PL Pathloss
PRI PUCCH Resource Index
PUCCH Physical Uplink Control Channel
PUSCH Physical Uplink Shared Channel
RAN Radio Access Network
RS Reference Signal
TCI Transmission Configuration Indicator
TDM Time Division Multiplexing
TRP Transmission Reception Point
UCI Uplink Control Information
UE User Equipment
UL Uplink

We claim:

1. An apparatus, comprising:
at least one processor; and
at least one memory comprising computer program code, the at least one memory and the computer program code are configured, with the at least one processor, to cause the apparatus at least to
detect that a pathloss reference reference-signal is not provided for multi-transmission reception point uplink repetition or transmission scheme;
determine a first reference signal resource and a second reference signal resource as a result of the detecting;
calculate two pathloss values using the first reference signal resource and the second reference signal resource; and
perform separate uplink power control for repetitions or transmissions toward different transmission reception points according to the two pathloss values,
wherein determination of the first reference signal resource and the second reference signal resource depends at least partially on at least one of:
a transmission reception point scheme in downlink, or
a transmission configuration indicator state or a quasi co-location assumption of at least one control resource set or transmission configuration indicator state of a physical downlink shared channel,
wherein the transmission reception point scheme in downlink comprises at least one of:
a multi-downlink control information multi-transmission reception point scheme,
a single-downlink control information multi-transmission reception point scheme,
a single transmission reception point based physical downlink shared channel reception scheme, or
a physical downlink control channel repetition scheme with multi-transmission reception point,
wherein, in case of the multi-downlink control information multi-transmission reception point scheme, the first reference signal resource and the second reference signal resource are determined to be a reference signal of the transmission configuration indicator state of the latest physical downlink shared channel scheduled by a physical downlink control channel on a control resource set in the control resource set pool with control resource set pool index value of 0, and a reference signal of the transmission configuration indicator state of a latest physical downlink shared channel scheduled by a physical downlink control channel on a control resource set in the control resource set pool with control resource set pool index value of 1, respectively, and
wherein, in case of the single transmission reception point based physical downlink shared channel reception scheme,
the first reference signal resource is a reference signal of a transmission configuration indicator or quasi co-location assumption of the control resource set with a lowest index, and
the second reference signal resource is a reference signal of the transmission configuration indicator or quasi-colocation assumption of the control resource set with the second lowest index.

2. The apparatus according to claim 1, wherein, in case of the multi-downlink control information multi-transmission reception point scheme,
the first reference signal resource is a reference signal of a transmission configuration indicator or a quasi co-location assumption of a control resource set with a lowest control resource set index in a control resource set pool with a control resource set pool index value of 0, and
the second reference signal resource is a reference signal of the transmission configuration indicator or the quasi co-location assumption of the control resource set with a lowest control resource set index in the control resource set pool with a control resource set pool index value of 1.

3. The apparatus according to claim 1, wherein, in case of the single-downlink control information multi-transmission reception point scheme,
the first reference signal resource is a reference signal of a first transmission configuration indicator state of a lowest codepoint among transmission configuration indicator codepoints containing two physical downlink shared control channel transmission configuration indicator states, and the second reference signal resource is a reference signal of a second transmission configuration indicator state of the same transmission configuration indicator codepoint as in the first reference signal resource.

4. The apparatus according to claim 1, wherein, in case of the single-downlink control information multi-transmission reception point scheme, the first reference signal resource and the second reference signal resource are respectively determined to be a reference signal of the transmission configuration indicator or quasi co-location assumption of the control resource set with the lowest index, and a reference signal of the transmission configuration indicator or quasi co-location assumption of the control resource set with the second lowest index.

5. The apparatus according to claim 1, wherein, in case of the single-downlink control information multi-transmission reception point scheme, the first reference signal resource and the second reference signal resource are respectively determined to be a reference signal of the first transmission configuration indicator state provided by the transmission configuration indicator codepoint of the latest physical downlink shared channel scheduled with two transmission configuration indicator states, and a reference signal of the second transmission configuration indicator state contained in this same transmission configuration indicator codepoint.

6. The apparatus according to claim 1, wherein, in case of the physical downlink control channel repetition scheme with multi-transmission reception point, and in a single frequency network context, the first reference signal resource is a reference signal of a first transmission configuration indicator or quasi co-location assumption of a control resource set with a lowest index having two transmission configuration indicator states or quasi co-location assumptions, and the second reference signal resource is a reference signal of a second transmission configuration indicator or quasi co-location assumption of the same control resource set as with the first reference signal resource.

7. The apparatus according to claim 1, wherein, in case of the physical downlink control channel repetition scheme with multi-transmission reception point, and in a non-single frequency network context where two search space sets are linked together and each associated with a different control resource set, the first reference signal resource is a reference signal of a transmission configuration indicator or quasi co-location assumption of the control resource set associated with the search space set with lowest index among linked search space sets, and the second reference signal resource is a reference signal of the transmission configuration indicator or quasi co-location assumption of the control resource set associated with the other linked search space set.

* * * * *